US011389943B2

(12) United States Patent
DeWind

(10) Patent No.: US 11,389,943 B2
(45) Date of Patent: Jul. 19, 2022

(54) TOOL PALLET APPARATUS

(71) Applicant: DeWind One-Pass Trenching, LLC, Zeeland, MI (US)

(72) Inventor: Ryan DeWind, Zeeland, MI (US)

(73) Assignee: One Pass Innovators, LLC, Zeeland, MI (US)

( * ) Notice: Subject to any disclaimer, the term of this patent is extended or adjusted under 35 U.S.C. 154(b) by 433 days.

(21) Appl. No.: 16/458,976

(22) Filed: Jul. 1, 2019

(65) Prior Publication Data

US 2021/0001473 A1 Jan. 7, 2021

(51) Int. Cl.

*B23Q 3/00* (2006.01)
*B25H 1/02* (2006.01)
*B25H 1/12* (2006.01)
*B25H 1/08* (2006.01)

(52) U.S. Cl.

CPC ................. *B25H 1/02* (2013.01); *B25H 1/08* (2013.01); *B25H 1/12* (2013.01)

(58) Field of Classification Search

CPC ...... B65D 25/005; B65D 19/08; B65D 19/44; B65D 19/06; B65D 19/38; B65D 19/0095; B65D 88/12; B65D 88/54; B65D 90/0046; B65D 90/008; B65D 85/68; B65D 85/06; B65D 2519/00059; B65D 2519/00004; B65D 2519/00024; B65D 2519/00273; B65D 2519/00323; B65D 2519/00333; B65D 2519/00293; B25H 1/02; B25H 1/08; B25H 1/12; Y10T 29/53435; Y10T 29/5337; Y10S 83/943; B66F 9/06; B66F 9/12; B62B 3/002; B62B 3/006; B62B 5/0083; B62B 5/0495

USPC .... 108/55.1, 53.1, 56.1, 54.1; 206/386, 598; 220/1.5; 312/351.1

See application file for complete search history.

(56) References Cited

U.S. PATENT DOCUMENTS 3,348,723 A * 10/1967 Wilson .................. B65D 19/12 220/6
5,553,991 A * 9/1996 Ferreira ............... B25H 1/0028 280/47.34
5,979,338 A * 11/1999 Salmanson ............ A47B 57/22 108/107
6,402,167 B1 * 6/2002 Calleja .................... B62B 3/006 108/55.1

(Continued)

*Primary Examiner* — Lee D Wilson

(74) *Attorney, Agent, or Firm* — The Watson IP Group, PLC; Jovan N. Jovanovic

(57) ABSTRACT

An apparatus includes a base portion, a workbench, and a compartment system. The base portion includes a first side, a second side, and an opening between the first side and the second side, the opening being sized to accommodate a lift to elevate the apparatus and move the apparatus from a first location to a second location. The workbench portion is disposed on an opposite end of the apparatus as the base portion, the workbench portion including a first side and a second side. The compartment system is disposed between the base portion and the workbench portion and comprising a plurality of support members coupled to the first side of the base portion and second side of the workbench portion. The compartment system further comprises at least one of a vertical divider and a horizonal divider to accommodate a worksite equipment. The plurality of support members support the workbench portion.

16 Claims, 3 Drawing Sheets

(56) References Cited

U.S. PATENT DOCUMENTS

| | | | | |
|---|---|---|---|---|
| 6,729,371 | B2 * | 5/2004 | Sheahan .................. | B25H 1/02<br>108/59 |
| 8,322,732 | B2 * | 12/2012 | McKay .................. | A47B 77/08<br>280/47.35 |
| 8,752,910 | B2 * | 6/2014 | Lin .......................... | B25H 1/12<br>312/212 |
| 8,944,444 | B1 * | 2/2015 | Tvrdy ....................... | B62B 3/10<br>280/79.2 |
| 9,333,596 | B2 * | 5/2016 | Luis y Prado ..... | B23K 37/0294 |
| 9,415,984 | B1 * | 8/2016 | Shinosky, Jr. ........... | B65G 1/04 |
| 2007/0102315 | A1 * | 5/2007 | Garcia De Alba .... | B65D 19/10<br>206/386 |
| 2008/0315734 | A1 * | 12/2008 | Birsel .................... | A47B 97/04<br>312/223.3 |
| 2011/0043085 | A1 * | 2/2011 | Parisena .................. | B25H 1/04<br>312/249.13 |

* cited by examiner

TOOL PALLET APPARATUS

CROSS-REFERENCE TO RELATED APPLICATION

NA

BACKGROUND OF THE DISCLOSURE

1. Field of the Disclosure

The disclosure relates in general to a pallet apparatus, and more particularly, to a tool pallet apparatus.

2. Background Art

Worksites, particularly those that include heavy equipment such as excavators, backhoes, bulldozers, bobcats, etc., also include addition worksite equipment such as welders, gas tanks, generators, electrical cords, drills, water hoses, and other worksite equipment that is typically used on such worksites. Such worksite equipment is typically transported to such worksites via pickup trucks. Such pickup trucks are typically configured to hold such worksite equipment. However, such pickup trucks may not have access to an entire worksite. Thus, substantial manual labor is typically needed to remove such worksite equipment from the pickup trucks, transport such worksite equipment throughout the worksite, transport such worksite equipment back to the pickup trucks, and reload such worksite equipment onto the pickup trucks.

SUMMARY OF THE DISCLOSURE

The disclosure is directed to an apparatus that includes a base portion, a workbench, and a compartment system. The base portion includes a first side, a second side, and an opening between the first side and the second side, the opening being sized to accommodate a lift to elevate the apparatus and move the apparatus from a first location to a second location. The workbench portion is disposed on an opposite end of the apparatus as the base portion, the workbench portion including a first side and a second side. The compartment system is disposed between the base portion and the workbench portion and comprising a plurality of support members coupled to the first side of the base portion and second side of the workbench portion. The compartment system further comprises at least one of a vertical divider and a horizonal divider to accommodate a worksite equipment, with the plurality of support members supporting the workbench portion.

In some configurations, the lift includes a pair of forklift forks.

In some configurations, the base portion has an approximate width W and an approximate length L, the base portion being one of 40 inches W×48 inches L, 42 inches W×42 inches L, 48 inches W×48 inches L, 48 inches W×40 inches L, 48 inches W×42 inches L, 40 inches W×40 inches L, 48 inches W×45 inches L, 44 inches W×44 inches L, 36 inches W×36 inches L, 48 inches W×36 inches L, 35 inches W×45.5 inches L, and 48 inches W×20 inches L.

In some configurations, the apparatus further includes an electrical cord mount including a first winding post and a second winding post.

In some configurations, the electrical cord mount is coupled to the compartment system.

In some configurations, the workbench portion is coupled to the compartment system via a plurality of bolts.

In some configurations, the apparatus further includes a vise coupled to the workbench surface.

In some configurations, the apparatus further includes a crowbar mount to couple at least one crowbar to the apparatus.

In some configurations, the workbench portion includes at least one hole through the workbench portion to guide the at least one crowbar into the crowbar mount.

In some configurations, the crowbar mount is coupled to the base portion.

In some configurations, the compartment system further includes a vertical divider disposed between the first side of the base portion and the second side of the workbench portion.

In some configurations, the vertical divider creates a compartment that is approximately sized to accommodate at least one of a welder, a generator, and a combination welder/generator.

In some configurations, the apparatus further includes an electrical wire mount.

In some configurations, the electrical wire mount is coupled to the workbench portion.

In some configurations, the compartment system further includes a gas tank mount to secure the gas tank to the apparatus.

In some configurations, the compartment system further includes a cubbyhole including four surrounding walls.

In some configurations, the cubbyhole is sized to accommodate a bin.

In some configurations, at least one of the plurality of support members is doglegged to accommodate entry and exit of at least one of the plurality of worksite equipment.

BRIEF DESCRIPTION OF THE DRAWINGS

The disclosure will now be described with reference to the drawings wherein.

DETAILED DESCRIPTION OF THE DISCLOSURE

Figure 1:
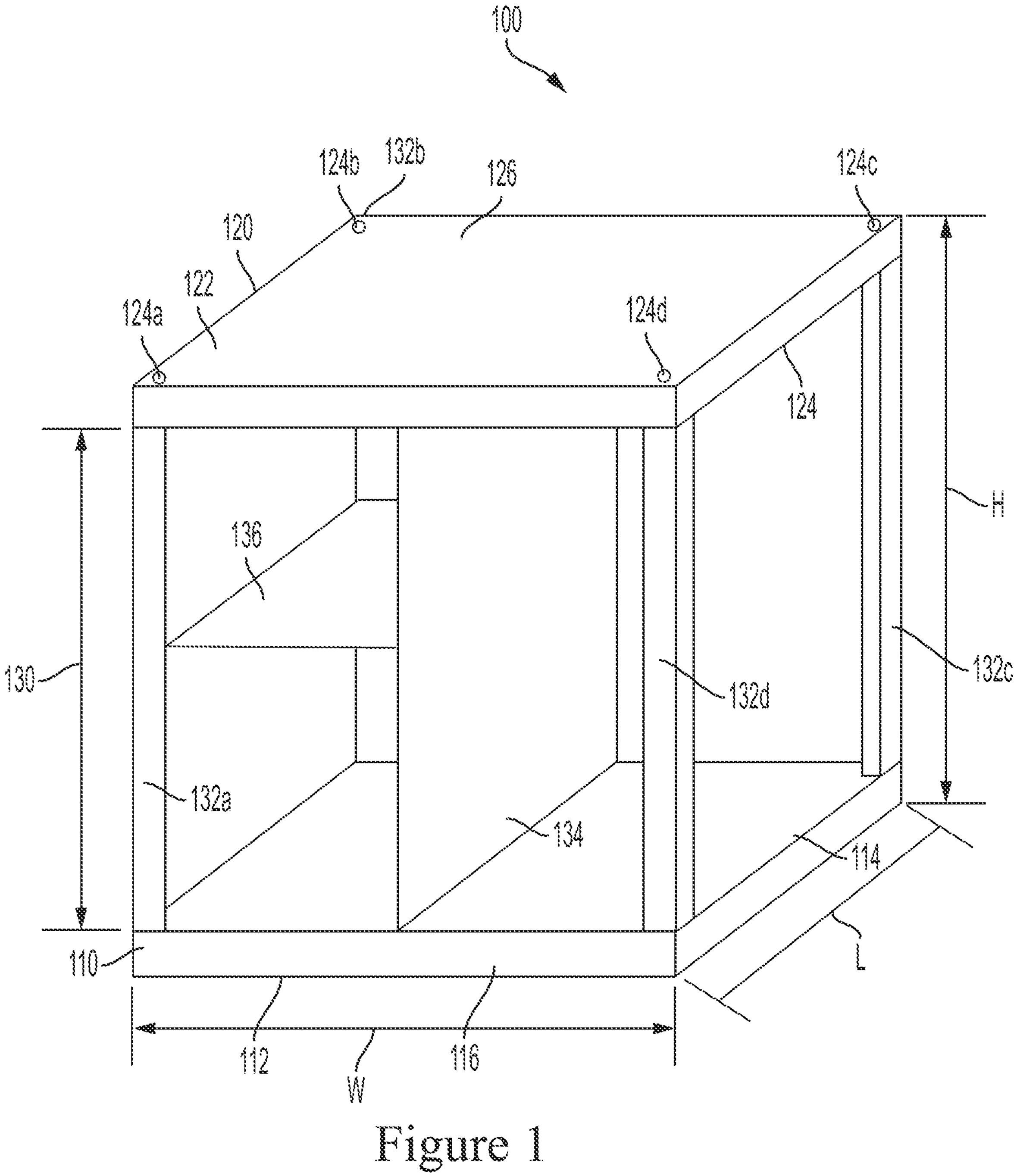
FIG. 1 illustrates an isometric view of an example tool pallet apparatus the present disclosure.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

With reference to the deficiencies discussed above, an apparatus is disclosed, such as the example tool pallet apparatus 100, that provides a convenient way to transport multiple pieces of worksite equipment to a worksite. Referring now to the drawings and in particular to FIG. 1, an isometric view of the tool pallet apparatus 100 illustrates that the tool pallet apparatus 100 includes a base portion 110, a workbench portion 120, and a compartment system 130. In at least one embodiment, the base portion 110, the workbench portion 120, and/or the compartment system 130 can be constructed of steel, aluminum, a metal alloy, a plastic, or any other material that provides the strength needed to maintain a form and use of the tool pallet apparatus 100. One of ordinary skill in the art will understand that the tool pallet apparatus 100 and tool pallet apparatus 200 (FIG. 2) are examples, with the tool pallet apparatus 100/200 being extensively configurable and customizable to fulfil functionality requirements for a particular worksite.

The base portion 110 includes a first side 114, a second side 112, and an opening 116 between the first side 112 and the second side 116. The opening 116 is sized to accommodate a lift (FIG. 3) that elevates the tool pallet apparatus 100 and moves the tool pallet apparatus 100 from a first location to a second location, such as on a worksite. In at least one embodiment, the lift 315 is a telescopic handler forklift, as shown. In other embodiments, the lift 315 is an industrial reach forklift truck, industrial counterbalance forklift, rough terrain forklift, industrial side loader forklift, and pedestrian operated pallet truck. The base portion 110 has an approximate (+−15%) width W and an approximate (+−15%) length L. In at least one embodiment, the base portion 110 is one of 40 inches W×48 inches L, 42 inches W×42 inches L, 48 inches W×48 inches L, 48 inches W×40 inches L, 48 inches W×42 inches L, 40 inches W×40 inches L, 48 inches W×45 inches L, 44 inches W×44 inches L, 36 inches W×36 inches L, 48 inches W×36 inches L, 35 inches W×45.5 inches L, and 48 inches W×20 inches L. These sizes for the base portion 110 correspond to various standard U.S. sizes for pallets. In other embodiments, the base portion 110 correspond to various standard non-U.S. sizes for pallets. In other embodiments, the base portion 110 does not correspond to any standard sizes for pallets. The base portion 110 typically is disposed, on the second side 112, on soil, concrete, or any other worksite surface.

The workbench portion 120 is disposed on an opposite end of the tool pallet apparatus 100 as the base portion 110, with the workbench portion 120 including a first side 122 and a second side 124. In at least one embodiment, the workbench portion 120 is approximately (+−10%) sized to correspond with the base portion 110. In at least one embodiment, the workbench portion 120 includes a workbench surface 126 that corresponds to the first side 122 of the workbench portion 120, onto which worksite tools can be disposed, worksite tools can be mounted onto, worksite labor can be conducted on, etc. In at least one embodiment, the workbench portion 120 is coupled to the compartment system 130 via a plurality of bolts 124*a*, 124*b*, 124*c*, 124*d* that are disposed proximate to the corners of the workbench portion 120, as shown. In other embodiments, the workbench portion 120 is coupled to the compartment system 130 via another fastener type, such as welding, high strength adhesive, riveting, etc.

The compartment system 130 is disposed between the base portion 110 and the workbench portion 120. The compartment system 130 is comprised of a plurality of support members 132*a*, 132*b*, 132*c*, 132*d* coupled to the first side 114 of the base portion 110 and the second side 124 of the workbench portion 120, the support members 132*a*, 132*b*, 132*c*, 132*d* supporting the workbench portion 120 and any items disposed and/or mounted on the workbench portion 120. The length of the plurality of support members 132*a*, 132*b*, 132*c*, 132*d* creates an overall height H for the tool pallet apparatus 100. This height H is typically a height that easily accommodates a storage of worksite equipment within the compartment system 130 while simultaneously providing easy access to the workbench surface 126 for a user. Although four support members 132*a*, 132*b*, 132*c*, 132*d* are shown, the compartment system 130 can include more or less support members as needed.

The compartment system 130 is further comprised of at least one of a vertical divider 134 and a horizontal divider 136, such as to each accommodate a worksite equipment. The vertical divider 134 can be disposed anywhere on the first side 114 of the base portion 110 to create a space on at least one side thereof to accommodate worksite equipment. In at least one embodiment, the vertical divider 134 can bear loads and act as a support member to support the workbench portion 120. Likewise, the horizontal divider 136 can be disposed anywhere between the base portion 110 and the workbench portion 120 to create a space on at least one side thereof to accommodate worksite equipment. The number of vertical dividers 134 and horizontal dividers 136 used for the tool pallet apparatus 100 is only limited by the space between the base portion 110 and the workbench portion 120, and user needs. The compartment system 130 accommodates a plurality of worksite equipment, which are shown in more detail in FIGS. 2 and 3. The compartment system 130 includes various vertical and/or horizontal dividers that are used to make one or more cubbyholes, which are shown and discussed in more detail in FIG. 3.

Figure 2:
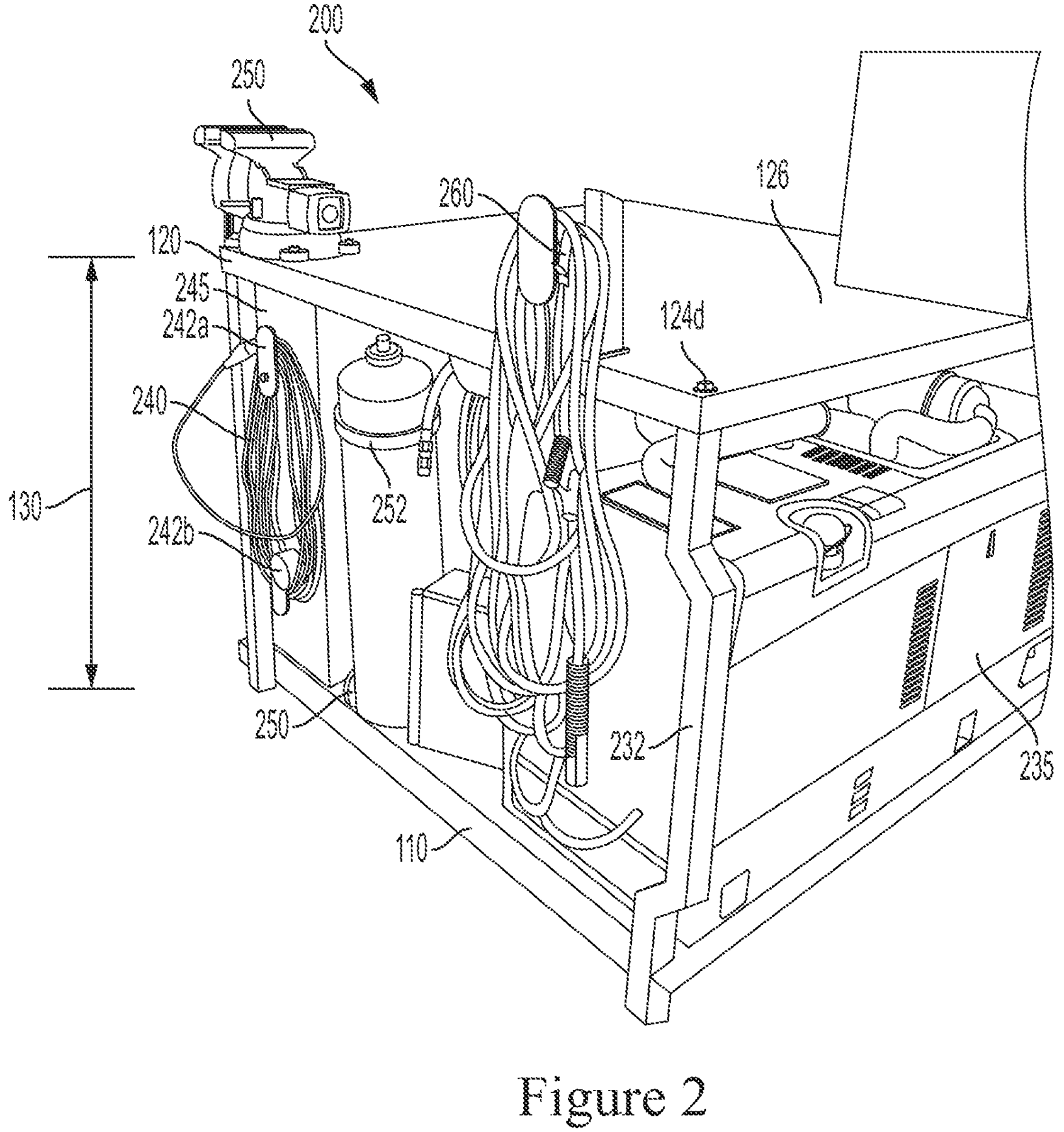
FIG. 2 illustrates an isometric view of another example tool pallet apparatus the present disclosure.

FIG. 2 illustrates an isometric view of yet another tool pallet apparatus 200 including various vertical dividers and horizontal dividers, along with various example worksite equipment that can be used with the tool pallet apparatus 200. For example, the tool pallet apparatus 200 includes an electrical cord winding mount. The tool pallet apparatus 200 includes an electrical cord 140 wound onto an electrical cord mount including a first winding post 242*a* and a second winding post 242*b*. In at least one embodiment, the first winding post 242*a* and the second winding post 242*b* are coupled to the compartment system 130, such as vertical divider 245 that is disposed between the first side 114 of the base portion 110 and the second side 124 of the workbench portion 120. In other embodiments, the first winding post 242*a* and the second winding post 242*b* are coupled to other portions of the tool pallet apparatus 200, such as the base portion 110 and/or the workbench portion 120. Although the electrical cord 140 is shown as being wound onto the first winding post 242*a* and the second winding post 242*b*, a water hose, an air hose, or any other hose or wire can be wound onto the first winding post 242*a* and the second winding post 242*b*.

In an example, the tool pallet apparatus 200 includes a vise 250 coupled to the workbench portion 120. The vise 250 is shown as being coupled to the workbench portion 120 at a corner of the workbench portion 120, however in other embodiments the vise 250 can be coupled to the workbench portion 120 anywhere on the first side 122 of the workbench portion 120. In an example, the tool pallet apparatus 200 includes a tank mount, such as the gas tank mount 250. The compartment system 130 includes the gas tank mount 250 to secure a gas tank 252 to the tool pallet apparatus 200. In the example shown, the gas tank mount 250 is disposed along an outside edge of the base portion 110 and is coupled to the first side 114 of the base portion 110, however in other examples the gas tank mount 250 can be disposed at any other location within the compartment system 130.

In an example, the tool pallet apparatus 200 includes an electrical wire mount, such as electrical wire mount 260. In an example, the electrical wire mount 260 is coupled to the workbench portion 120. In other examples, the electrical wire mount 260 can be mounted to a vertical divider of the compartment system 130.

In an example, at least one of the plurality of support members, such as illustrated support member 232, is doglegged to accommodate entry and exit of at least one of the plurality of worksite equipment, such as the shown combination welder/generator 235. Although a single doglegged support member is shown, depending upon the worksite equipment that the tool pallet apparatus 200 is configured to carry and accommodate, the tool pallet apparatus 200 can includes a plurality of doglegged support members. For example, the tool pallet apparatus 200 can include a second doglegged support member on an opposite end of the combination welder/generator 235 to allow the combination welder/generator 235 to enter and exit the compartment system 130 from either corner.

Figure 3:
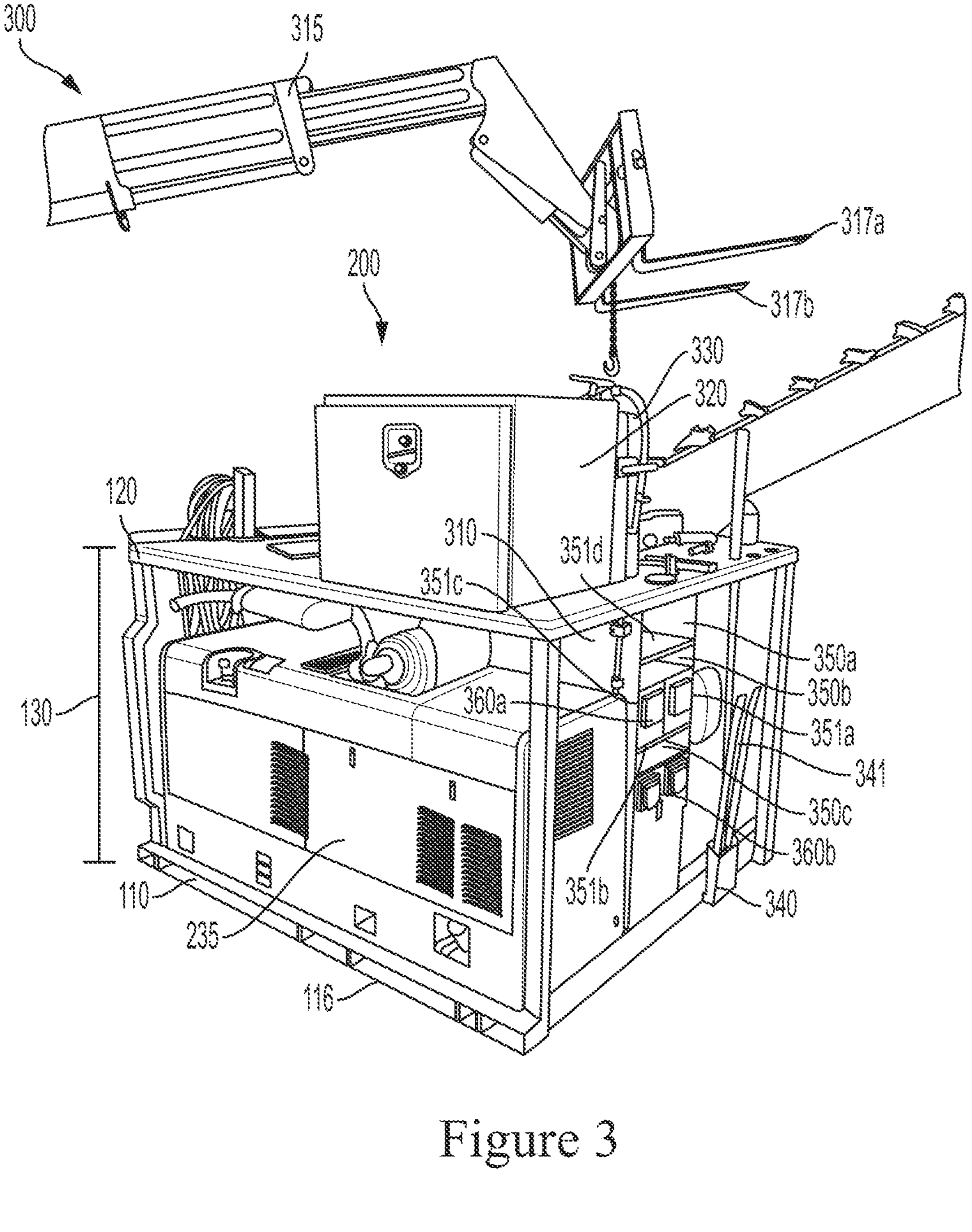
FIG. 3 illustrates an isometric view of the tool pallet apparatus shown in FIG. 2 the present disclosure.

FIG. 3 illustrates another isometric view of the tool pallet apparatus 200 including shown in FIG. 2. In an example, the tool pallet apparatus further includes another vertical divider, such as vertical divider 310. In this example, the vertical divider 310 is used to isolate the shown combination welder/generator 235 from other equipment within the compartment system 130. In an example, the vertical divider 310 creates a compartment that is approximately sized to accommodate at least one of a welder, a generator, and/or the shown combination welder/generator 235.

FIG. 3 further illustrates an example lift, such as the lift 315 (e.g., forklift) that includes a pair of forklift forks 317*a* and 317*b*. In at least one embodiment, a system 300 includes the lift 300 and the tool pallet apparatus 200. As shown, the workbench portion 120 is constructed to support various worksite equipment, such as a storage box 320 and a fire extinguisher 330.

In an example, the tool pallet apparatus 200 includes a crowbar mount 340 to couple at least one crowbar 341 to the tool pallet apparatus 200. In at least one embodiment, the workbench portion 120 includes at least one hole 342 through the workbench portion 120 to guide the at least one crowbar 341 into the crowbar mount 340. In this example, the crowbar mount 340 is coupled to the base portion 110. Although the crowbar mount 340 is illustrates as being disposed proximate to a corner of the tool pallet apparatus 200, the crowbar mount 340 can be disposed anywhere where convenient for a user of the tool pallet apparatus 200. Likewise, although the crowbar mount 340 is shown as being coupled to the base portion 110, in other embodiments the crowbar mount 340 is mounted to a divider, such as a vertical divider, of the compartment system 130.

In another example, the compartment system 130 further includes one or more cubbyholes 350*a*/350*b*/350*c* including four surrounding walls 351*a*/351*b*/351*c*/351*d*. In the example shown, the cubbyholes 350*a*/350*b*/350*c* are sized to accommodate one or more bins 360*a*/360*b*, such as to hold at least one of hand tools (e.g., drill, hammer, screwdriver, wrench, plier, etc.) bolts, nuts, pins, screws, and/or any other worksite equipment used on a worksite. The one or more cubbyholes 350*a*/350*b*/350*c* and the one or more bins 360*a*/360*b* are illustrates as being disposed centrally between two corners of the compartment system 130, however one or more cubbyholes 350*a*/350*b*/350*c* and the one or more bins 360*a*/360*b* can be disposed anywhere within the compartment system 130 that is convenient for a user of the tool pallet apparatus 200.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An apparatus, comprising:

a base portion including a first side, a second side, and an opening between the first side and the second side, the opening sized to accommodate a lift to elevate the apparatus and move the apparatus from a first location to a second location;

a workbench portion disposed on an opposite end of the apparatus as the base portion, the workbench portion including a first side and a second side;

a compartment system disposed between the base portion and the workbench portion and comprising a plurality of support members coupled to the first side of the base portion and second side of the workbench portion, the compartment system further comprising at least one of a vertical divider and a horizonal divider to accommodate a worksite equipment, the plurality of support members supporting the workbench portion; and a crowbar mount to couple at least one crowbar to the apparatus;

wherein the workbench portion includes at least one hole through the workbench portion to guide the at least one crowbar into the crowbar mount.

2. The apparatus according to claim 1, wherein the lift includes a pair of forklift forks.

3. The apparatus according to claim 1, wherein the base portion has an approximate width W and an approximate length L, the base portion being one of 40 inches W×48 inches L, 42 inches W×42 inches L, 48 inches W×48 inches L, 48 inches W×40 inches L, 48 inches W×42 inches L, 40 inches W×40 inches L, 48 inches W×45 inches L, 44 inches W×44 inches L, 36 inches W×36 inches L, 48 inches W×36 inches L, 35 inches W×45.5 inches L, and 48 inches W×20 inches L.

4. The apparatus according to claim 1, wherein the apparatus further includes an electrical cord mount including a first winding post and a second winding post.

5. The apparatus according to claim 1, wherein the electrical cord mount is coupled to the compartment system.

6. The apparatus according to claim 1, wherein the workbench portion is coupled to the compartment system via a plurality of bolts.

7. The apparatus according to claim 1, further comprising a vise coupled to the workbench surface.

8. The apparatus according to claim 1, wherein the crowbar mount is coupled to the base portion.

9. The apparatus according to claim 1, wherein the compartment system further includes a vertical divider disposed between the first side of the base portion and the second side of the workbench portion.

10. The apparatus according to claim 9, wherein the vertical divider creates a compartment that is approximately sized to accommodate at least one of a welder, a generator, and a combination welder/generator.

11. The apparatus according to claim 10, further comprising an electrical wire mount.

12. The apparatus according to claim 11, wherein the electrical wire mount is coupled to the workbench portion.

13. The apparatus according to claim 1, wherein the compartment system further includes a gas tank mount to secure the gas tank to the apparatus.

14. The apparatus according to claim 1, wherein the compartment system further includes a cubbyhole including four surrounding walls.

15. The apparatus according to claim 14, wherein the cubbyhole is sized to accommodate a bin.

16. The apparatus according to claim 1, wherein at least one of the plurality of support members is doglegged support member to accommodate entry and exit of at least one of the plurality of worksite equipment.

* * * * *